(12) United States Patent
Lee et al.

(10) Patent No.: US 11,251,682 B2
(45) Date of Patent: Feb. 15, 2022

(54) ELECTRIC MOTOR INCLUDING OIL SPRAYING PART

(71) Applicant: LG Magna e-Powertrain Co., Ltd., Incheon (KR)

(72) Inventors: Sungsoo Lee, Seoul (KR); Yongsoo Kang, Seoul (KR); Junghwan Kim, Seoul (KR); Shuang Liu, Seoul (KR); Seunghyun Jeong, Seoul (KR)

(73) Assignee: LG Magna e-Powertrain Co., Ltd., Incheon (KR)

( * ) Notice: Subject to any disclaimer, the term of this patent is extended or adjusted under 35 U.S.C. 154(b) by 85 days.

(21) Appl. No.: 16/623,661

(22) PCT Filed: Jun. 19, 2017

(86) PCT No.: PCT/KR2017/006394
§ 371 (c)(1),
(2) Date: Dec. 17, 2019

(87) PCT Pub. No.: WO2018/235969
PCT Pub. Date: Dec. 27, 2018

(65) Prior Publication Data
US 2020/0204044 A1 Jun. 25, 2020

(51) Int. Cl.
*H02K 9/193* (2006.01)
*H02K 1/14* (2006.01)
*H02K 1/32* (2006.01)

(52) U.S. Cl.
CPC ............ *H02K 9/193* (2013.01); *H02K 1/145* (2013.01); *H02K 1/32* (2013.01)

(58) Field of Classification Search
CPC .................................. H02K 9/19; H02K 1/32
USPC .............................................. 310/52, 54, 58
See application file for complete search history.

(56) References Cited

U.S. PATENT DOCUMENTS

| 4,138,862 A * | 2/1979 | Muller .................... H02K 9/19 310/54 |
| 2003/0075996 A1 | 4/2003 | Yoshida et al. |
| 2008/0024020 A1 | 1/2008 | Lund et al. |

(Continued)

FOREIGN PATENT DOCUMENTS

| CN | 105262280 | 1/2016 |
| JP | 2007215307 | 8/2007 |

(Continued)

OTHER PUBLICATIONS

EP Extended European Search Report in European Appln. No. 17915158.4, dated Dec. 8, 2020, 81 pages.

*Primary Examiner* — Jose A Gonzalez Quinones
(74) *Attorney, Agent, or Firm* — Fish & Richardson P.C.

(57) ABSTRACT

An electric motor includes: a case; a stator including a stator core disposed inside the case and a stator coil wound around the stator core; a rotor including a rotating shaft and being configured to rotate with respect to the stator; and an oil spraying part that is configured to store oil in a lower part of the case, that includes an oil passage configured to guide the oil to an upper area of the case and an oil pump for pumping the oil, and that is configured to spray the oil to an inner heating part of the case. Accordingly, the oil can suppress occurrence of short-circuiting of an electric circuit and rapidly cool a heating part.

19 Claims, 21 Drawing Sheets

(56) References Cited

U.S. PATENT DOCUMENTS

| | | | |
|---|---|---|---|
| 2009/0184591 A1* | 7/2009 | Hoshino | B60L 1/02 |
| | | | 310/54 |
| 2011/0156508 A1 | 6/2011 | Minemura et al. | |
| 2013/0020889 A1* | 1/2013 | Yamamoto | H02K 1/2766 |
| | | | 310/59 |
| 2015/0222162 A1* | 8/2015 | Pinkley | H02K 9/00 |
| | | | 310/54 |
| 2015/0275715 A1* | 10/2015 | Nagata | H02K 5/1732 |
| | | | 184/6 |
| 2017/0310179 A1* | 10/2017 | Okouchi | H02K 1/276 |

FOREIGN PATENT DOCUMENTS

| | | | |
|---|---|---|---|
| JP | 2009022145 | | 1/2009 |
| JP | 2009261181 A | * | 11/2009 |
| JP | 2010148272 | | 7/2010 |
| JP | 2011135698 | | 7/2011 |
| JP | 2011147246 A | * | 7/2011 |
| JP | 2015027173 | | 2/2015 |
| KR | 101700769 | | 1/2017 |

* cited by examiner

ELECTRIC MOTOR INCLUDING OIL SPRAYING PART

CROSS-REFERENCE TO RELATED APPLICATIONS

This application is a National Stage application under 35 U.S.C. § 371 of International Application No. PCT/KR2017/006394, filed on Jun. 19, 2017. The disclosure of the prior application is incorporated by reference in its entirety.

TECHNICAL FIELD

The present disclosure relates to an electric motor including an oil spraying part.

BACKGROUND ART

An electric motor is an apparatus that can covert electric energy into mechanical energy.

In some examples, the electric motor may include a stator and a rotor rotatable with respect to the stator.

The stator and/or the rotor may include a winding, and may have a temperature increase due to electric resistance heat of the winding when operated.

In some cases, the electric motor may have a lowered output (output density) when the temperature is excessively increased.

In some examples, the electric motor may include a cooling means.

For instance, a cooling means of the electric motor may include an air-cooled cooling means using air, and a water-cooled cooling means using water.

In some cases, where the electric motor includes the air-cooled cooling means, cooling of the electric motor may not be smoothly performed since specific heat of air is low.

In some cases of a high-capacity electric motor having a large output, the temperature of the electric motor may not be lowered to a value equal to or lower than a predetermined temperature by the air-cooled cooling means because a heating amount is very large.

In some cases of the water-cooled cooling means, a cooling water passage for accommodating cooling water should be formed. In these cases, the electric motor may have an increased size and an increased weight.

In some cases of the water-cooled cooling means is provided, a short circuit of an electric circuit may occur due to the cooling water.

In some examples, it may be difficult to directly cool a heating part of an electric circuit due to the occurrence of a short circuit. In these examples, the temperature of a partial region may be excessively increased.

As a result, an output of the electric motor may be lowered.

SUMMARY

The present disclosure describes an electric motor having an oil spraying part, capable of rapidly cooling a heating part.

The present disclosure also describes an electric motor having an oil spraying part, capable of reducing the occurrence of a short circuit due to a cooling fluid.

The present disclosure further describes an electric motor having an oil spraying part, capable of restricting the occurrence of an excessive temperature increase region.

The present disclosure further describes an electric motor having an oil spraying part, capable of rapidly cooling a heating part by shortening a heat transfer path.

The present disclosure further describes an electric motor having an oil spraying part, capable of accelerating cooling of a rotor.

According to one aspect of the subject matter described in this application, an electric motor includes a case, a stator including a stator core disposed inside the case and a stator coil disposed at the stator core, a rotor including a rotating shaft and being configured to rotate with respect to the stator, and an oil spraying part configured to store oil in a lower part of the case and to spray the oil to a heating part inside the case. The oil spraying part includes an oil passage configured to guide the oil to an upper area of the case and an oil pump configured to pump the oil in the lower part of the case.

Implementations according to this aspect may include one or more of the following features. For example, the oil spraying part may further include a coil end spraying part that is configured to spray the oil to coil ends of the stator coil, that defines spraying holes configured to discharge the oil, and that is disposed outside the coil ends. In some examples, the coil end spraying part may include: a spraying guide body that defines the spraying holes at a bottom surface thereof and an accommodation space configured to receive the oil therein; and a spraying guide cover that is coupled to the spraying guide body and that covers the accommodation space.

In some implementations, the spraying holes may be arranged along a plurality of rows, and the spray guide body may include separation guides disposed in the accommodation space and configured to guide the oil to flow along the plurality of rows. In some examples, the separation guides may be spaced apart from each other and each of the separation guides is disposed between the plurality of rows of the spraying holes.

In some implementations, the oil spraying part may include a stator core spraying part configured to spray the oil to the stator core. In some examples, the stator core spraying part may include at least one stator oil disc that defines oil grooves configured to guide the oil along a circumferential direction of the stator, where the at least on stator oil disc is inserted between electric steel plates of the stator core. In some examples, the stator oil disc may include teeth portions that correspond to poles and slots of the stator core, where the oil grooves extend along circumferences of the teeth portions in the circumferential direction of the stator.

In some examples, the stator oil disc may define an oil introduction part recessed in a radius direction of the stator and configured to communicate with the oil grooves. The stator oil disc may define an oil discharge part recessed in a radius direction of the stator and configured to communicate with the oil grooves. In some examples, the stator core may define concave parts recessed in a radius direction from an external surface of the stator core, and the stator oil disc may include rotation prevention protrusions inserted into the concave parts.

In some implementations, the rotor may include: rotor cores that are arranged along the rotation shaft, that surround the rotation shaft, and that are configured to rotate the rotation shaft relative to the stator; and a rotor oil disc inserted between the rotor cores and configured to accelerate a flow of the oil based on rotation of the rotor cores relative to the stator. In some examples, the rotor oil disc may define a shaft hole at a central region of the rotor oil disc and at least one oil transfer groove that extends outward from a circumference of the shaft hole in a radius direction and that is recessed in an axial direction of the rotor.

In some examples, the rotor cores may define an oil channel that extends along the axial direction of the rotor and that is configured to communicate with the at least one oil transfer groove. In some examples, the at least one oil transfer groove may include oil transfer grooves that are recessed from a first side of the rotor oil disc in the axial direction, where the rotor oil disc may include protrusions that protrude from a second side of the rotor oil disc in the axial direction and that are located at positions corresponding to the oil transfer grooves. In some examples, the at least one oil transfer groove may be recessed from both sides of the rotor oil disc in the axial direction.

In some implementations, the case may include: a case body having a cylindrical shape, and a case cover disposed at both ends of the case body. The electric motor may further include bearings configured to rotatably support the rotation shaft and located at the case cover, and the oil spraying part may further include a bearing oil supplying part configured to supply the oil to the bearings.

In some implementations, the case may include a cooling water heat exchange part configured to exchange heat between the oil and cooling water. In some examples, the cooling water heat exchange part may include heat exchange fins that protrude to an inside of the cooling water heat exchange part and that increase a contact area with the cooling water.

In some implementations, the stator coil may protrude from both axial ends of the stator core in an axial direction of the stator, and the coil ends may be exposed to an outside of the stator core.

In some implementations, where the oil spraying part for spraying oil is provided in the case, the heating part may be rapidly cooled.

In some implementations, where oil is sprayed to the heating part as a cooling fluid, the occurrence of a short circuit due to a cooling fluid may be reduced.

In some implementations, where oil is directly sprayed to the heating part, the occurrence of an excessive temperature increase region at the heating part may be prevented.

In some implementations, where the coil end spraying part sprays oil to the coil ends, heat generated from the coil ends is not discharged through the stator core and the case, but is directly exchanged by oil. This may allow a heat transfer path to be shortened, thereby rapidly cooling the heating part.

In some implementations, where a stator core oil spraying part sprays oil to the stator core, a heat transfer path of the stator coil may be shortened. This may allow the stator coil and the stator core to be rapidly cooled.

In some implementations, where the rotor oil disc guides oil to flow into the rotor when the rotor is rotated, cooling of the rotor may be accelerated.

In some implementations, where the bearing oil supplying part supplies oil to the bearings, lubrication and cooling of the bearings may be accelerated. This may allow the lifespan of the bearings to be prolonged.

In some implementations, where the cooling water heat exchange part exchanges heat between oil and cooling water at the case, heat inside the case may be rapidly discharged to the outside.

DETAILED DESCRIPTION

Figure 1:
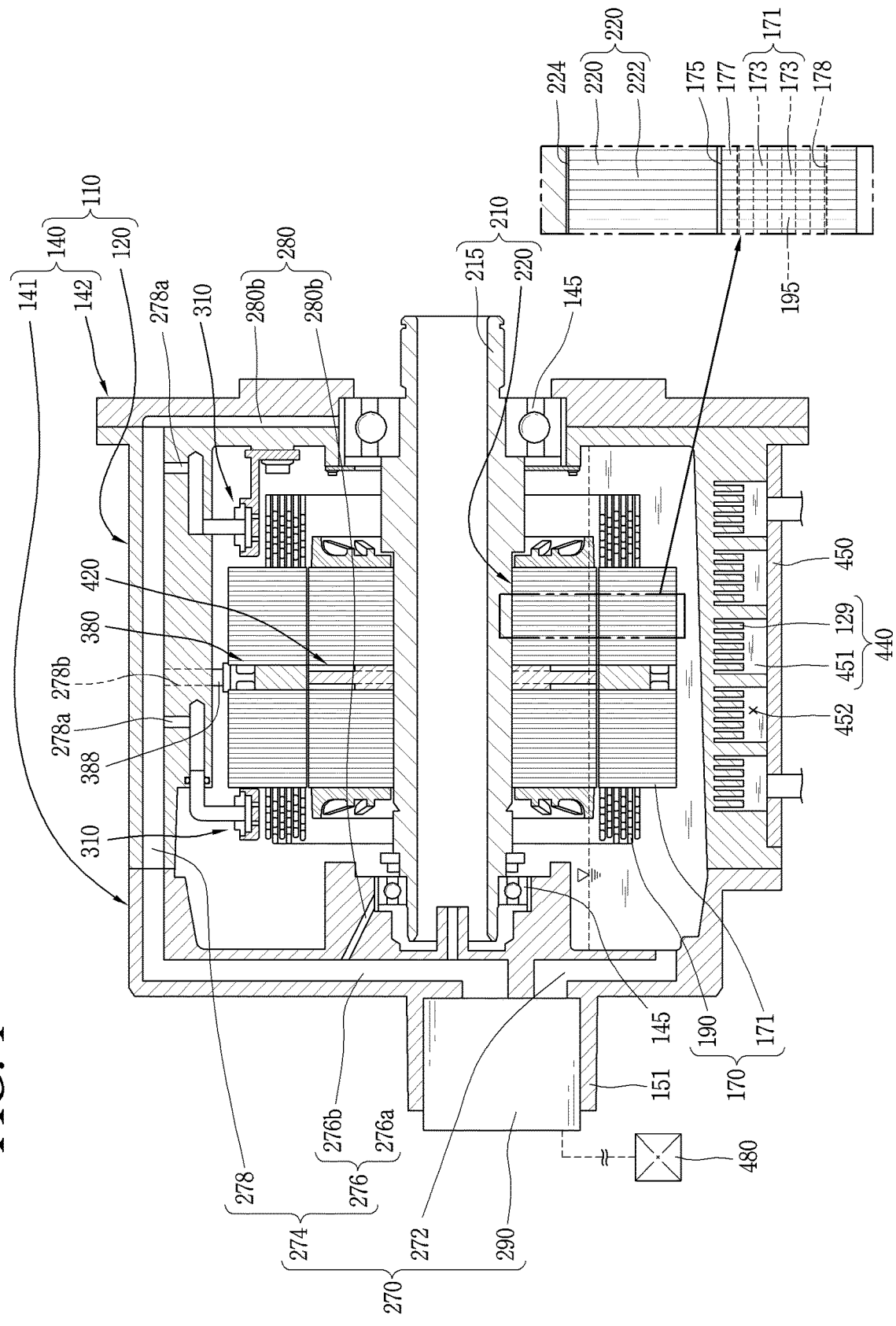
FIG. 1 is a sectional view showing an example of an electric motor including an oil spraying part.

Hereinafter, one or more implementations of the present disclosure will be described in detail with reference to the accompanying drawings. Herein, like reference numerals denote like elements even in different implementations, and a description for an element appearing first will replace descriptions for like elements appearing later.

FIG. 1 is a sectional view showing an example of an electric motor including an oil spraying part. As shown in FIG. 1, the electric motor including an oil spraying part may include a case 110; a stator 170 having a stator core 171 provided in the case 110, and having a stator coil 190 wound on the stator core 171; a rotor 210 having a rotation shaft 215 and arranged to be rotatable with respect to the stator 170; and an oil spraying part 270 having an oil 272 to be stored at a lower part of the case 110, an oil passage 274 through which the oil 272 moves to an upper region of the case 110, and an oil pump 290 for pumping the oil 272, and the oil spraying part configured to spray the oil 272 to a heating part inside the case 110.

The case 110 may define an accommodation space therein.

For instance, the case 110 may include a case body 120 of a cylindrical shape and a case cover 140 provided at both ends of the case body 120.

In some implementations, the case cover 140 may include a first case cover 141 coupled to the left side of the case body 120, and a second case cover 142 coupled to the right side of the case body 120.

The stator 170 may be accommodated in the case 110.

In some implementations, the stator 170 may include a stator core 171, and a stator coil 190 wound on the stator core 171.

The stator core 171 may define a rotor accommodation hole 175 for accommodating the rotor 210 therein.

The stator core 171 may define a plurality of poles 177 and slots 178 which are alternately formed in a circumferential direction, at a circumference of the rotor accommodation hole 175.

The stator coil 190 may be wound on the plurality of slots 178.

In some implementations, the stator coil 190 may be formed by connecting conductors 195 inserted into the plurality of slots 178 (hairpins) to each other in a preset pattern.

In some implementations, the stator coil 190 may include coil ends 190a protruding from both ends of the stator core 171 in an axial direction. In some examples, the coil ends may be exposed to an outside of the stator core.

In some examples, the stator core 171 may be formed by insulation-laminating a plurality of electric steel plates 173 having the rotor accommodation hole 175, the slots 178 and the poles 177 on each other.

The rotor 210 may include a rotation shaft 215, and a rotor core 220 that rotates around the rotation shaft 215 as a center of rotation.

Both ends of the rotation shaft 215 may be supported by bearings 145.

In some implementations, the bearings 145 may be provided at the case cover 140.

In some examples, the rotor 210 may be provided with a plurality of magnets 231 inserted into the rotor core 220 in an axial direction.

In some cases, the rotor 210 may be provided with a rotor coil wound on the rotor core 220.

An oil spraying part 270 for directly spraying the oil 272 to the heating part formed in the case 110 may be provided in the case 110.

In some examples, the heating part inside the case 110 may be rapidly cooled.

The oil spraying part 270 may be provided with oil 272 stored in the case 110, an oil passage 274 through which the oil 272 flows to an upper area of the case 110, and an oil pump 290 for pumping the oil 272.

The oil pump 290 may be connected to a controller 480 so as to be controllable by a preset program.

In some examples, the oil 272 may be sprayed at a preset speed based on being pressurized with a preset pressure by the oil pump 290. Accordingly, the heating part may be rapidly cooled, and a temperature increase of the heating part may be significantly restricted.

In some implementations, the oil spraying part 270 may include coil end spraying parts 310 for spraying the oil 272 to the coil ends 190a of the stator coil 190.

The coil end spraying parts 310 may be provided at the coil ends 190a which are formed at both sides of the stator core 171, respectively.

In some implementations, unlike one example where a temperature increase occurs as a heat discharge speed is slow because an external surface is surrounded by air, the oil 272 may be directly sprayed to each coil end 190a at a preset speed for cooling. This may significantly restrict a temperature increase of each coil end 190a.

For instance, the oil spraying part 270 may be provided with a stator core spraying part 380 for spraying the oil 272 to the stator core 171.

In some examples, unlike an example where the conductors 195 inserted into the slots 178 of the stator core 171 discharge heat slowly, the stator core 171 can be cooled significantly.

The case 110 may be configured so that its inside is hermetically shielded.

More specifically, the case body 120 may form a hermetic space therein as both ends thereof are shielded by the case cover 140.

The oil 272 may be stored in the case 110.

An oil storage space 122 for storing the oil 272 may be formed in the case 110.

For instance, the oil 272 may be configured to be provided with a proper viscosity and a low temperature fluidity, and provided with an abrasion resistance, a heat resistance and an oxidation resistance.

In some cases, the oil 272 may be vehicle transmission (gearbox) oil.

The oil passage 274 along which the oil 272 which is at a lower part of the case 110 moves to an upper region of the case 110 may be formed at the case 110.

In some implementations, the oil passage 274 may include a first section 276 formed at the case cover 140, and a second section 278 formed at the case body 120.

For instance, the first section 276 may be formed to be communicated with the oil storage space 122 inside the case body 120.

The first section 276 may be formed at the first case cover 141 or the second case cover 142.

Hereinafter, an instance that the first section 276 is formed at the first case cover 141 will be explained as an example.

For instance, an oil pump connection part 151 for connecting the oil pump 290 may be formed at the case cover 140 (the first case cover 141).

For instance, the first section 276 may be provided with a suction section 276a for sucking the oil 272 inside the case 110, and a discharge section 276b for discharging the oil 272 upward.

The second section 278 may be formed at the case body 120 so as to be communicated with the first section 276.

For instance, the second section 278 may be provided with a plurality of divergence sections for distributing the oil 272 to different regions.

For instance, the plurality of divergence sections may include first divergence sections 278a formed at both sides of the stator core 171 so as to distribute the oil 272.

For instance, the first divergence sections 278a may be formed in two, so as to correspond to both sides of the stator core 171.

For instance, the plurality of divergence sections may include a second divergence section 278b formed to distribute the oil 272 towards the stator core 171.

For instance, the second divergence section 278b may be formed to correspond to an approximate middle region of the stator core 171.

The oil passage 274 may be provided with a bearing oil supplying part 280 for supplying the oil 272 to the bearings.

In some examples, a friction of the bearings 145 may be reduced, and a temperature increase of the bearings 145 may be restricted.

The bearing oil supplying part 280 may be formed at the case cover 140.

For instance, the bearing oil supplying part 280 may be provided with a first bearing oil supplying part 280a formed at the first case cover 141, and a second bearing oil supplying part 280b formed at the second case cover 142.

The first bearing oil supplying part 280*a* may be formed so as to be communicated with the discharge section 276*b* of the first section 276.

The second bearing oil supplying part 280*b* may be formed so as to be communicated with the second section 278.

A cooling water heat exchange part 440 for heat-exchanging the oil 272 with cooling water 451 may be formed at the case 110.

In some examples, the oil 272 having its temperature increased by contacting the heating part inside the case 110, is heat-exchanged with the cooling water 451 having large specific heat. This may allow the oil 272 to be cooled rapidly.

For instance, the cooling water heat exchange part 440 may be provided with a water jacket 450 which forms a cooling water accommodation space 452 by being coupled to the case 110.

The water jacket 450 may be coupled to the case body 120 in a separable manner.

The water jacket 450 may be coupled to the case cover 140 in a separable manner.

For instance, the cooling water heat exchange part 440 may be provided with heat exchange fins 129 for increasing a heat exchange area with the cooling water 451.

For instance, the heat exchange fins 129 may be formed to protrude from an external surface of the case 110 (the case body 120).

In this embodiment, the heat exchange fins 129 are provided at the case 110. However, the heat exchange fins 129 may be formed at the water jacket 450, or may be provided at both the case 110 and the water jacket 450.

Figure 2:
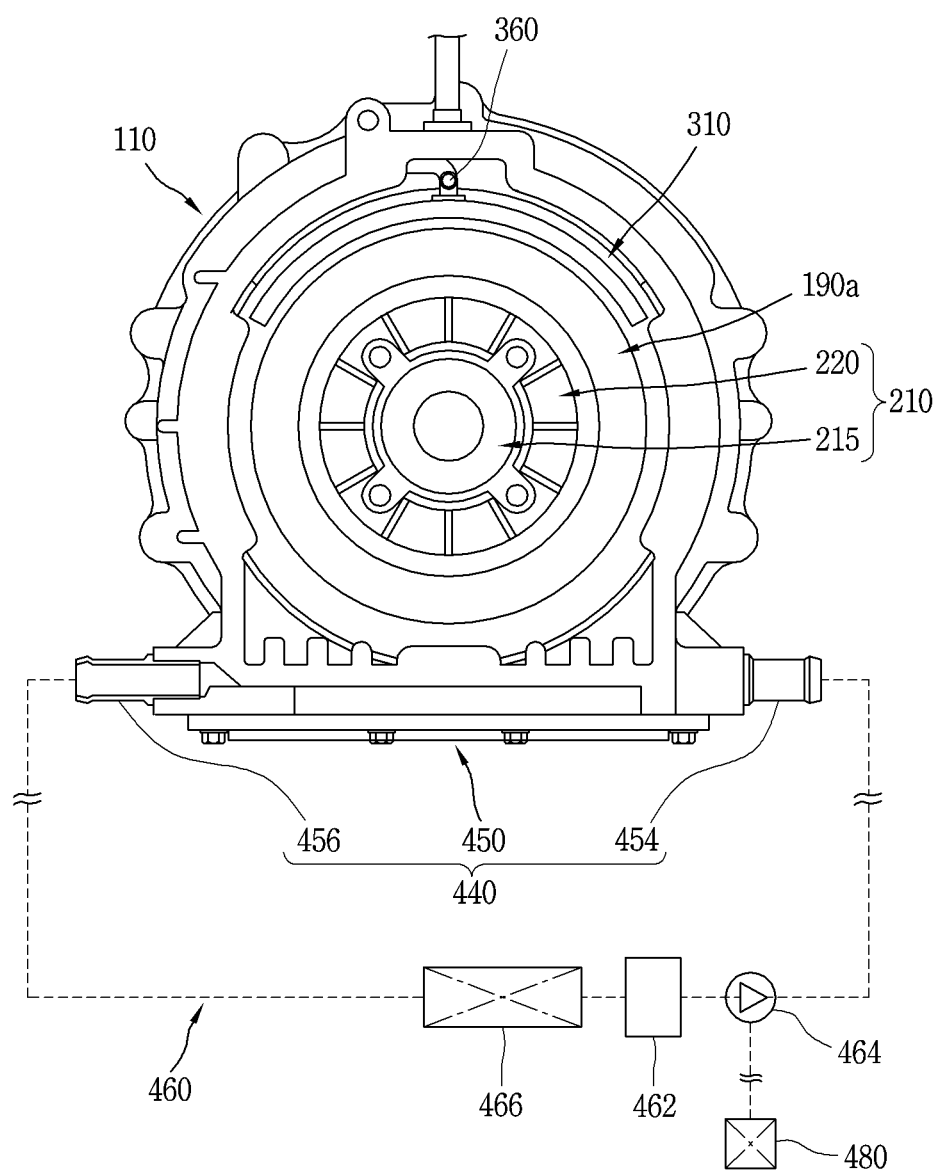
FIG. 2 is a right side view showing an example of a stator of FIG. 1.
Figure 3:
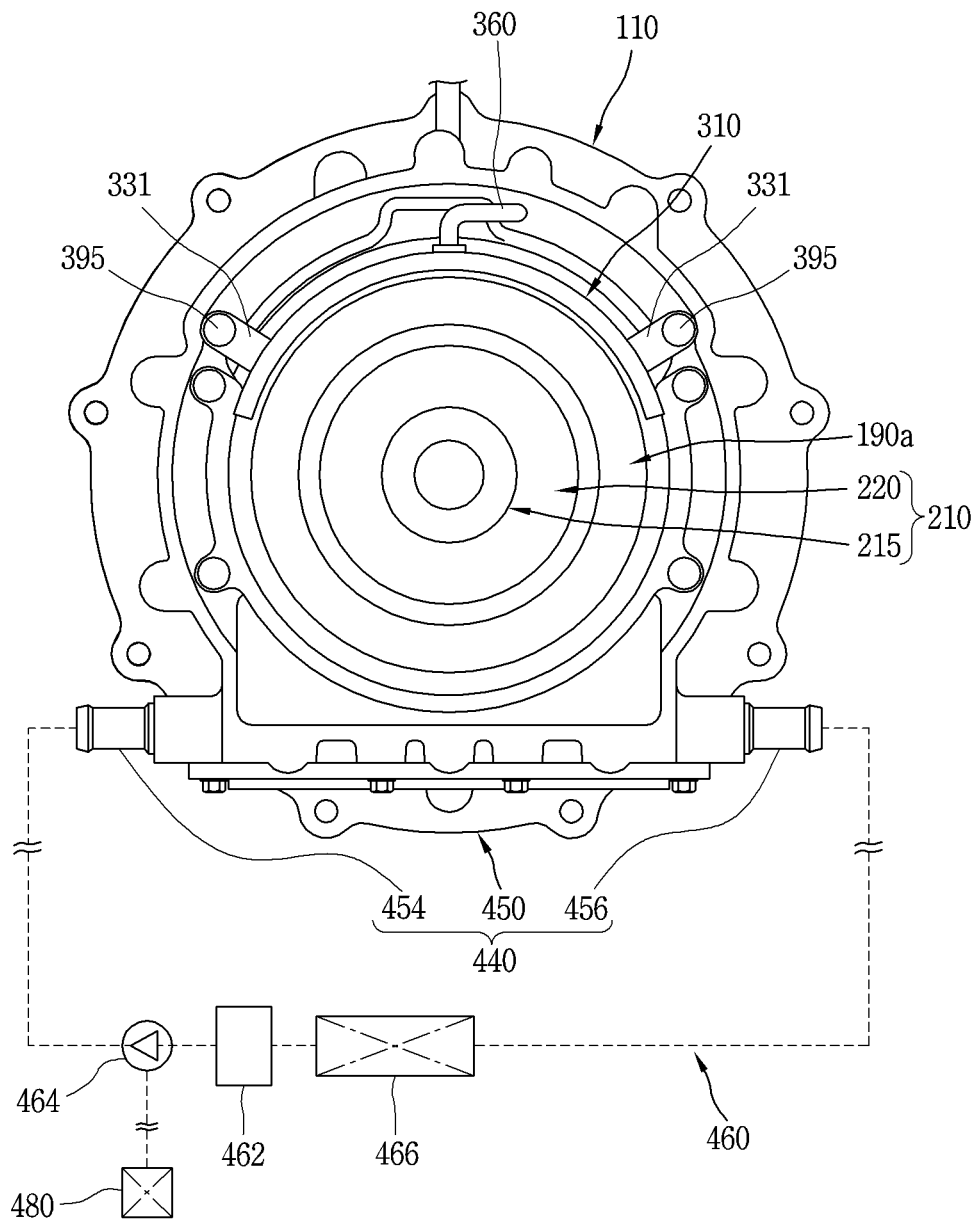
FIG. 3 is a left side view showing an example of a stator of FIG. 1.

FIG. 2 illustrates a right side view of the stator of FIG. 1, and FIG. 3 illustrates a left side view of the stator of FIG. 1.

As shown in FIGS. 2 and 3, the cooling water heat exchange part 440 may be provided with a cooling water introduction part 454 for introducing the cooling water 451 into the cooling water accommodation space 452.

A cooling water discharge part 456 for discharging the cooling water 451 of the cooling water accommodation space 452 may be formed at the cooling water heat exchange part 440.

For instance, the cooling water introduction part 454 and the cooling water discharge part 456 may be connected to a cooling water circulation circuit 460.

For instance, the cooling water circulation circuit 460 may be provided with a cooling water heat exchanger 466 (e.g., a radiator of a vehicle) for cooling the cooling water 451.

For instance, the cooling water circulation circuit 460 may be provided with a cooling water tank 462 for storing the cooling water 451 therein.

For instance, the cooling water circulation circuit 460 may be provided with a cooling water pump 464 for pumping the cooling water 451.

For instance, the cooling water pump 464 may be configured to pump the cooling water 451 of the cooling water tank 462.

For instance, the oil spraying part 270 may be provided with coil end spraying parts 310 for spraying the oil 272 to the coil ends 190*a* of the stator coil 190.

The coil end spraying parts 310 may be arranged above the coil ends 190*a* which are formed at both ends of the stator coil 190.

In some examples, the oil 272 is directly sprayed to an upper region of the coil ends 190*a* of the stator coil 190, which has a relatively high temperature by convection. This may allow the coil ends 190*a* to be cooled more rapidly.

The coil end spraying parts 310 may be connected to the first divergence sections 278*a*, respectively.

In some examples, the oil 272 introduced into the second section 278 may be supplied to each of the coil end spraying parts 310.

The coil end spraying part 310 may be provided with spraying holes 327 for spraying the oil 272, and may be arranged outside the coil end 190*a*.

Figure 4:
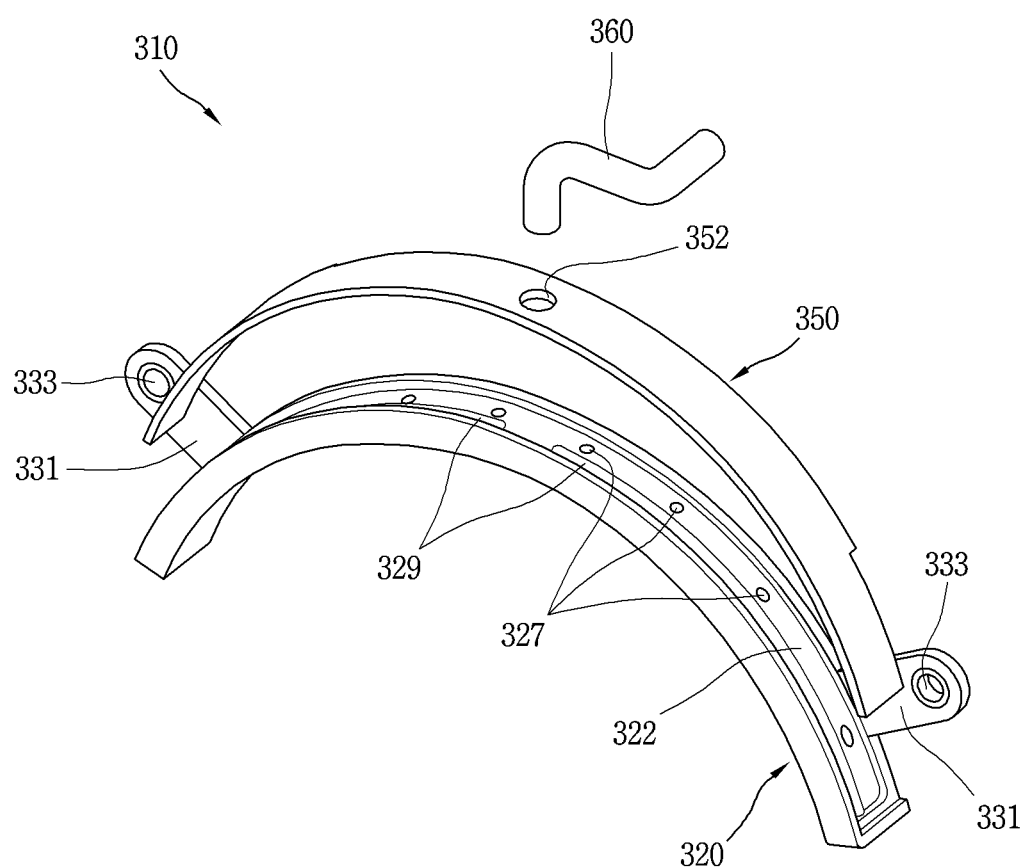
FIG. 4 is a disassembled perspective view showing an example of a coil end spraying part of FIG. 1.
Figure 5:
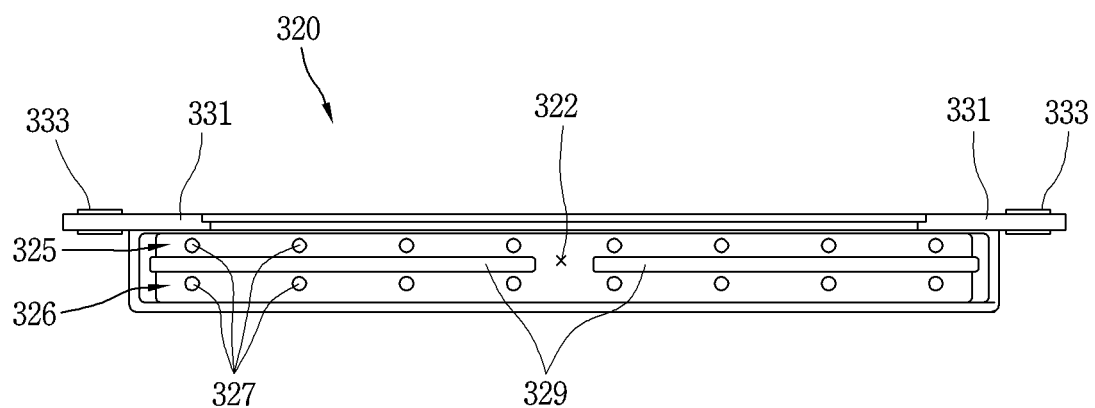
FIG. 5 is a planar view showing an example of a spraying guide body of FIG. 4.
Figure 6:
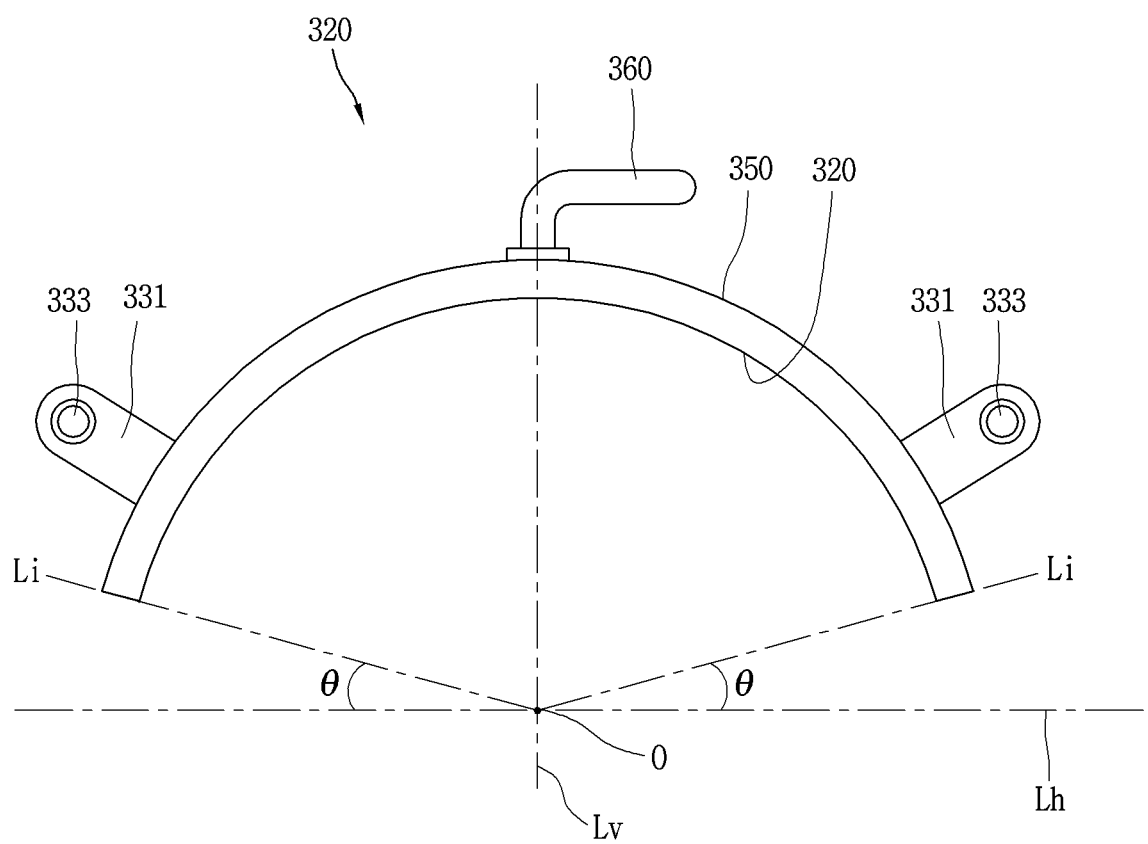
FIG. 6 is a front view of FIG. 4.

FIG. 4 is a disassembled perspective view showing the coil end spraying part of FIG. 1. FIG. 5 is a planar view showing an example of a spraying guide body of FIG. 4. FIG. 6 is a front view showing the coil end spraying part of FIG. 4.

As shown in FIG. 4, the coil end spraying part 310 may include a spraying guide body 320 having the spraying holes 327 at a bottom surface, and a spraying guide cover 350 coupled to the spraying guide body 320 and forming an accommodation space of the oil 272 therein.

The coil end spraying part 310 may be provided with an arc shape so as to correspond to an external surface of the coil end 190*a* of the stator coil 190.

For instance, the spraying guide body 320 may be configured to have therein an oil accommodation space 322 having its upper side open.

For instance, a sectional surface of the spraying guide body 320 may be provided with a rectangular shape.

The plurality of spraying holes 327 for spraying the oil 272 stored in the spraying guide body 320 may be penetratingly-formed at a bottom surface of the spraying guide body 320.

Coupling protrusions 331 for coupling the spraying guide body 320 to the stator core 171 may be formed at the spraying guide body 320.

The coupling protrusions 331 may be formed at both sides of the spraying guide body 320.

A coupling member insertion hole 333 for inserting a coupling member 335 to be coupled to the stator core 171 may be penetratingly-formed at each of the coupling protrusions 331.

The spraying guide cover 350 for covering an upper opening of the spraying guide body 320 may be coupled to an upper end of the spraying guide body 320.

The spraying guide cover 350, a thin plate member may be configured to have an arc shape.

For instance, the spraying guide cover 350 may be configured to hermetically cover the opening of the spraying guide body 320.

In some examples, the oil 272 may be accommodated (temporarily stored) in the spraying guide body 320 and the spraying guide cover 350, by a predetermined pressure.

One end of the spraying guide cover 350 may be connected to another end of a connection pipe 360 connected to the case body 120, for communication.

A communication hole 352 for communication with another end of the connection pipe 360 may be penetratingly-formed at the spraying guide cover 350.

For instance, one end of the connection pipe 360 may be insertion-coupled to the communication hole 352.

As shown in FIG. 5, the plurality of spraying holes 327 may be formed at the spraying guide body 320.

The plurality of spraying holes 327 may be configured to have a plurality of different rows.

The plurality of spraying holes 327 may be implemented in a first row 325 and a second row 326.

Separation guides 329 for making the oil 272 flow in a separated manner may be provided between the first row 325 and the second row 326 of the spraying guide body 320.

For instance, the separation guides 329 may be formed to protrude from a bottom surface of the spraying guide body 320, by a preset height.

In some examples, the oil 272 introduced into the spraying guide body 320 through the connection pipe 360 may be prevented from being sprayed to one of the first row 325 and the second row 326 in a biased manner. This may allow the oil 272 to be uniformly sprayed to the spraying holes 327 of the first row 325 and the second row 326.

For instance, the separation guide 329 may be configured in plurality in number.

The separation guides 329 may be configured to be spaced apart from each other by a predetermined distance.

In some examples, since the oil 272 is easily exchanged between the first row 325 and the second row 326, non-uniform spraying of the oil 272 may be prevented.

In this embodiment, the separation guides 329 are configured in two. However, this is merely exemplary, and the number may be one or three or more.

As shown in FIG. 6, the coil end spraying part 310 may be spaced apart from a horizontal center line (Lh) of the stator 170 by a predetermined distance, for instance.

Virtual lines (Li) which connect a crossing point (0) between the horizontal center line (Lh) of the stator 170 and a vertical center line (Lv), to both ends of the coil end spraying part 310 may be configured to form a preset inclination angle (8).

For instance, the inclination angle (8) may be formed as 10° to 20°.

More preferably, the inclination angle (8) may be formed as 15°.

In some examples, the oil 272 directly sprayed on an upper surface of each coil end 190a may flow down to a lower part of each coil end 190a along an external surface of each coil end 190a, thereby uniformly cooling each coil end 190a.

Figure 7:
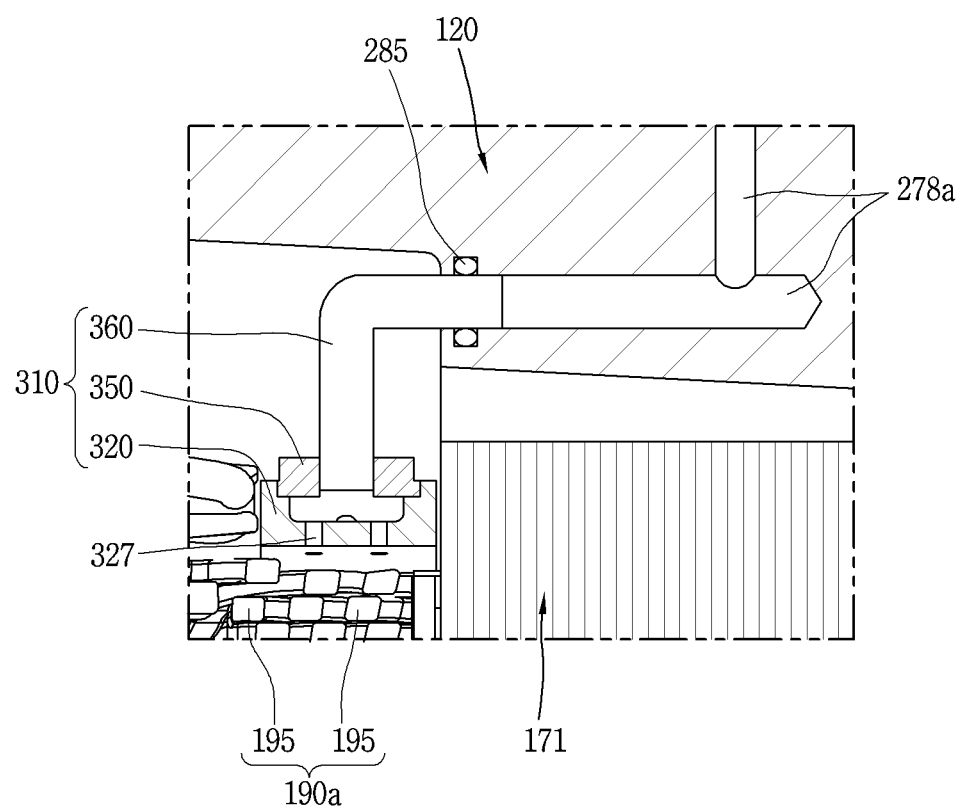
FIG. 7 is a sectional view showing a part of FIG. 2.
Figure 8:
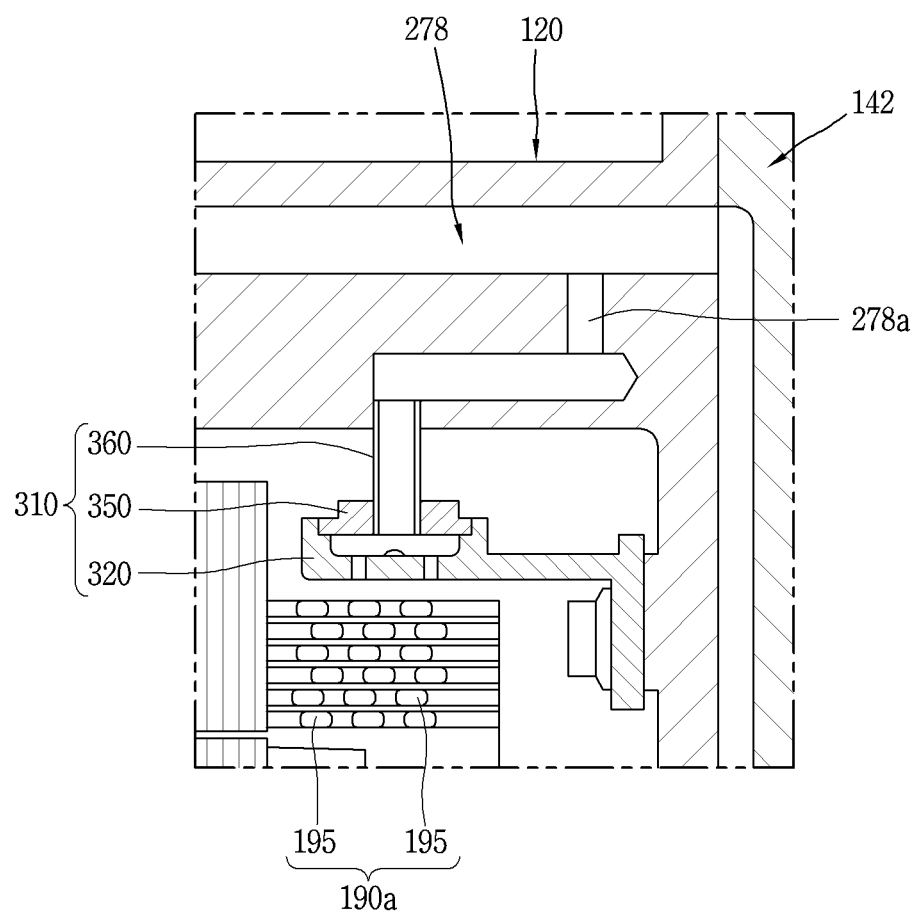
FIG. 8 is a sectional view showing a part of FIG. 3.

FIG. 7 is a sectional view showing a part of FIG. 2, and FIG. 8 is a sectional view showing a part of FIG. 3.

As shown in FIGS. 7 and 8, the connection pipe 360 of each coil end spraying part 310 may be coupled to the first divergence section 278a formed at the case body 120.

Each of the connection pipes 360 may be coupled to the first divergence section 278a by being inserted into the first divergence section 278a by a preset depth.

An oil seal 285 (e.g., o-ring) for preventing leakage of the oil 272 may be provided between each of the connection pipes 360 and the first divergence section 278a.

Figure 9:
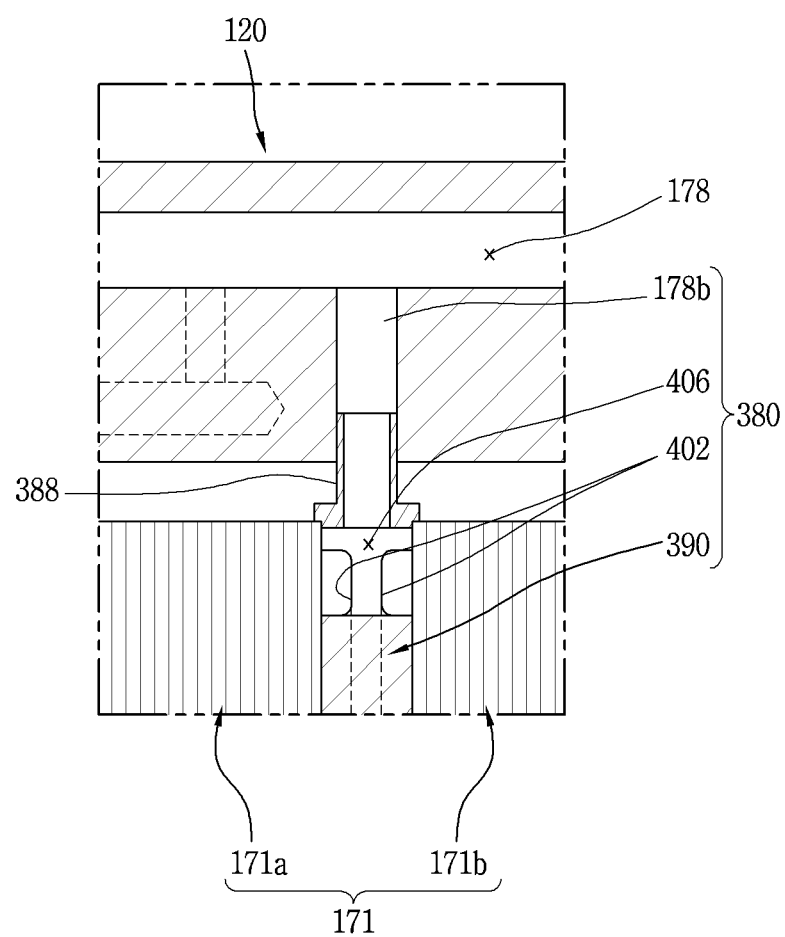
FIG. 9 is an enlarged sectional view showing an example of a second divergence section of a case body corresponding to a stator core spraying part region of FIG. 1.

FIG. 9 is an enlarged sectional view showing an example of a second divergence section of the case body 120 corresponding to a stator core spraying part region of FIG. 1.

As shown in FIG. 9, the second divergence section 278b may be formed at the second section 278 of the case body 120, so as to correspond to the stator core spraying part 380.

In some implementations, the oil 272 may be supplied to the stator core spraying part 380.

The second divergence section 278b may be formed to correspond to an approximate middle region of the stator core 171.

Figure 10:
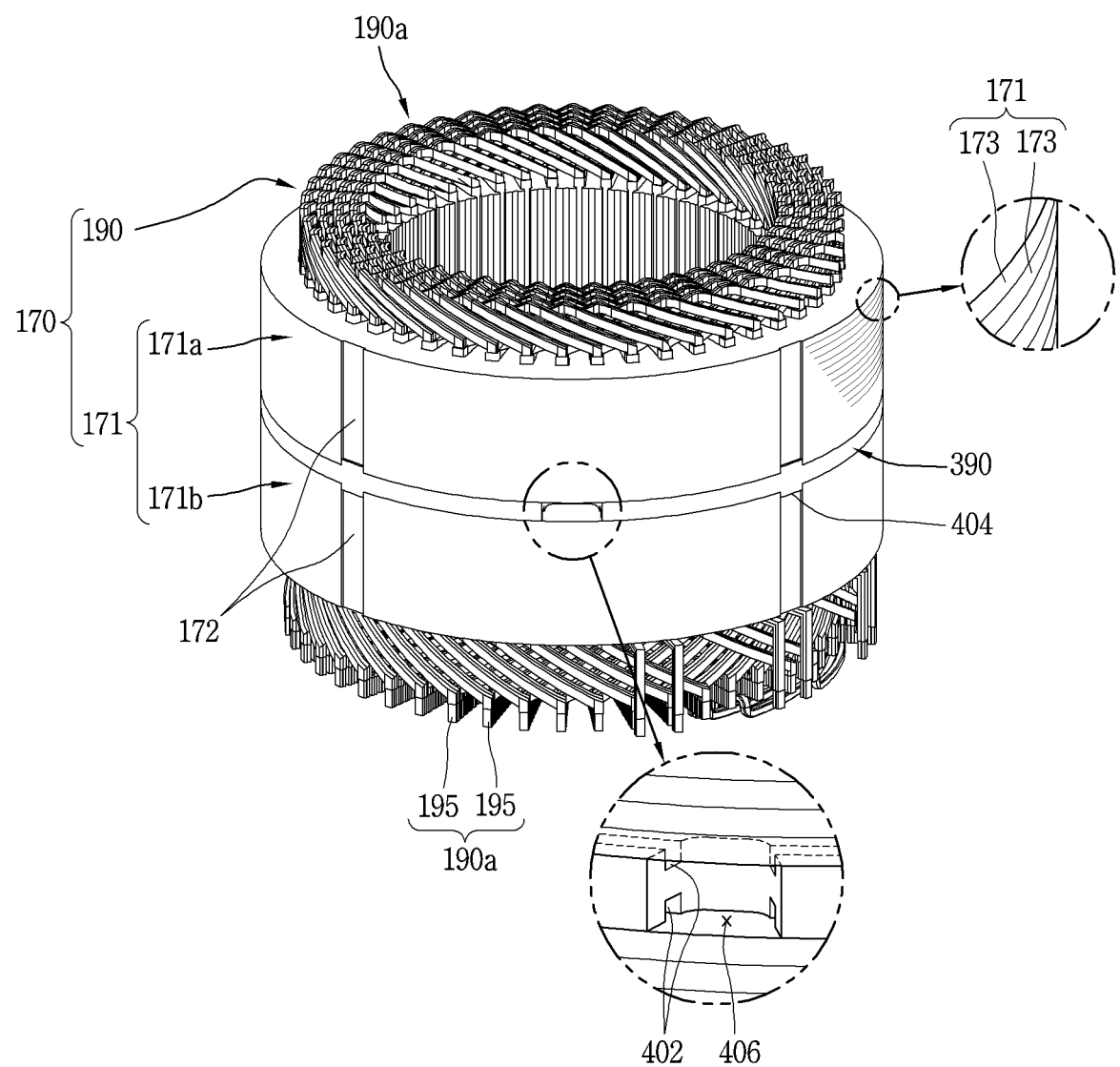
FIG. 10 is a perspective view showing an example of a stator of FIG. 1.
Figure 11:
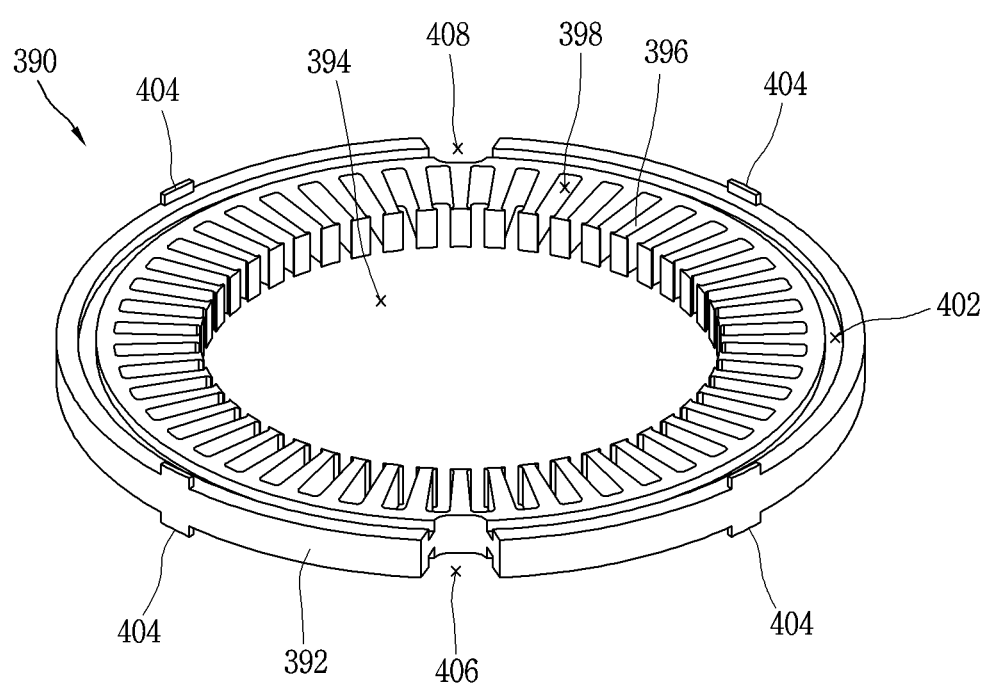
FIG. 11 is a perspective view showing an example of a stator oil disc of FIG. 10.
Figure 12:
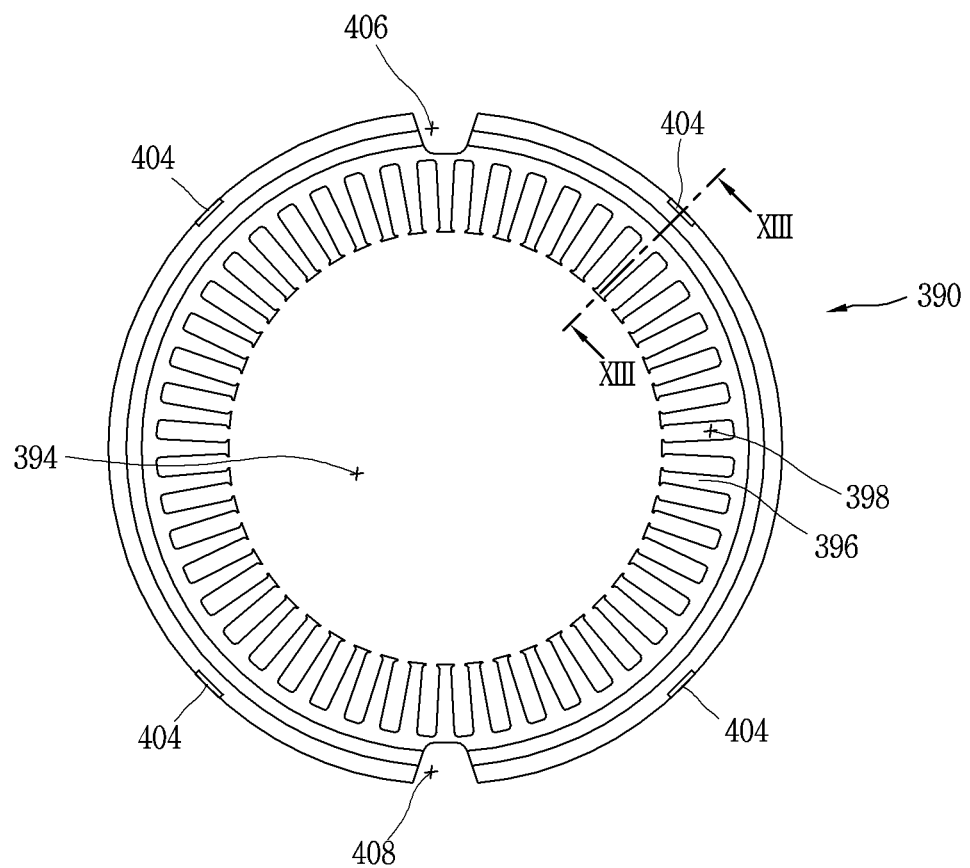
FIG. 12 is a planar view of FIG. 11.
Figure 13:
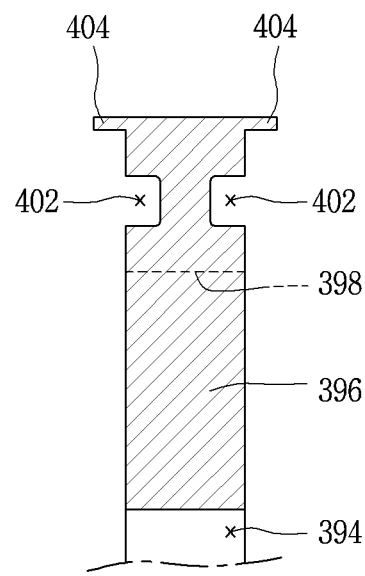
FIG. 13 is a partial sectional view of FIG. 12.
Figure 14:
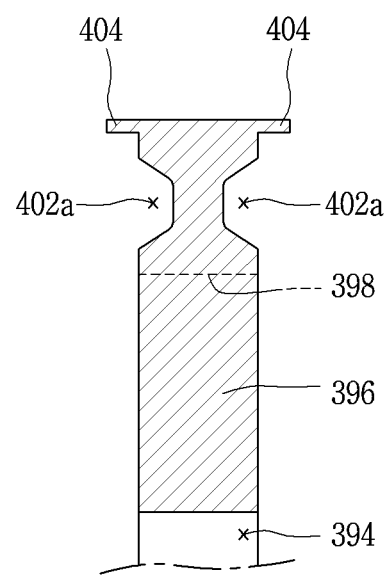
FIGS. 14 to 17 are views showing examples of an oil groove of FIG. 13, respectively.
Figure 15:
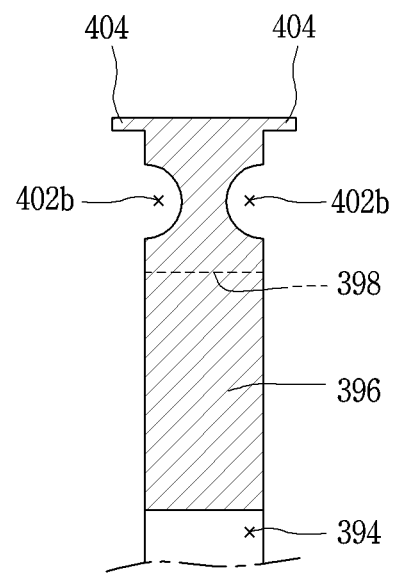
Figure 16:
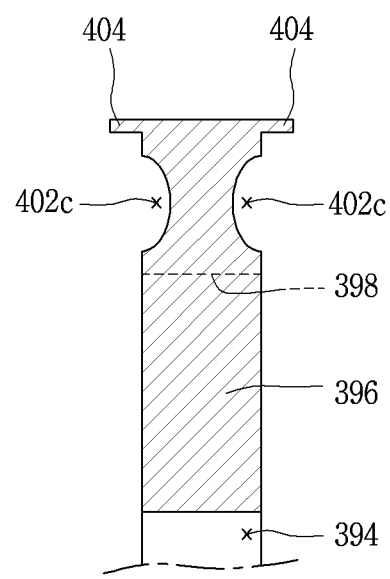

FIG. 10 is a perspective view showing an example of a stator of FIG. 1. FIG. 11 is a perspective view showing an example of a stator oil disc of FIG. 10. FIG. 12 is a planar view showing the stator oil disc FIG. 11. FIG. 13 is a partial sectional view showing an example of an oil groove region of FIG. 12. And FIGS. 14 to 16 are views showing modified implementations of oil grooves of FIG. 13, respectively.

As shown in FIG. 10, the oil spraying part 270 may be configured to be provided with the stator core spraying part 380 for spraying the oil 272 to the stator core 171.

The stator core spraying part 380 may be configured to be provided with at least one stator oil disc 390 having oil grooves 402 for making the oil 272 flow in a circumferential direction of the stator 170, and the stator oil disc 390 inserted between the electric steel plates 173 of the stator core 171.

In some implementations, one stator oil disc 390 is inserted into an approximate middle region of the stator 170. However, the number of the stator oil disc 390 may be property controlled by considering a length of the stator core 171 in an axial direction (a lamination thickness) and a heating degree.

As shown in FIGS. 11 and 12, the stator oil disc 390 may be provided with a stator oil disc body 392 of a disc shape.

The stator oil disc body 392 may have therein a rotor accommodation space 394 for rotatably inserting the rotor 210.

The stator oil disc body 392 may have teeth portions 396 and conductor accommodation parts 398 formed at a circumference of the rotor accommodation space 394 in correspondence to the poles 177 and the slots 178 of the stator core 171, respectively.

Oil grooves 402 for making the oil 272 flow in a circumferential direction may be formed at the stator oil disc body 392.

In some implementations, the oil grooves 402 may be formed to be concaved from a plate surface of the stator oil disc body 392 in an axial direction, and to extend in a circumferential direction.

The oil grooves 402 may be formed to be concaved from both plate surfaces of the stator oil disc body 392.

The oil grooves 402 may be configured to have the same inner width.

As shown in FIG. 14, oil grooves 402a may be formed to have inclined both side walls so that the inner width is increased towards an opening.

As shown in FIG. 15, oil grooves 402b may be formed to have an arc shape so that the inner width is increased towards an opening.

As shown in FIG. 16, oil grooves 402c may be formed to have an oval shape so that the inner width is increased towards an opening.

Figure 17:
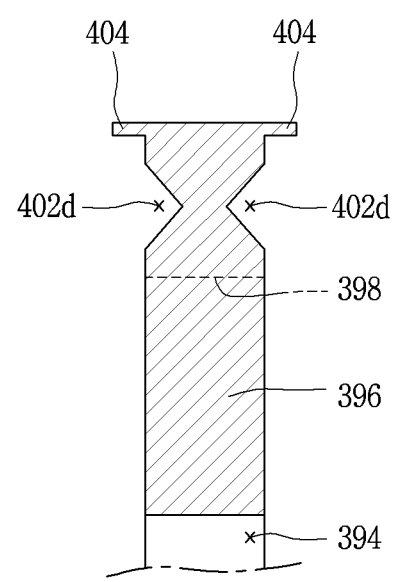

As shown in FIG. 17, oil grooves 402d may be formed to have a triangular shape so that the inner width is increased towards an opening.

As shown in FIGS. 14 to 17, where the oil grooves 402a, 402b, 402c, 402d are formed so that the inner width is increased towards the opening, a contact area between the stator core 171 and the oil 272 may be increased. This may accelerate cooling of the stator core 171.

An oil introduction part 406 for introducing the oil 272 into the oil grooves 402 may be formed at the stator oil disc body 392.

The oil introduction part 406 may be formed by cutting-out an outer diameter surface of the stator oil disc body 392.

The oil introduction part 406 may be arranged to be communicated with an outlet of the second divergence section 278b.

In some examples, the oil 272 sprayed from the second divergence section 278b may be introduced through the oil introduction part 406, and then may be moved along the oil grooves 402.

Here, an oil guide part 388 for guiding the oil 272 may be provided between the oil introduction part 406 and the second divergence section 278b.

An oil discharge part 408 for discharging the oil 272 which has moved along the oil grooves 402 may be formed at the stator oil disc body 392.

The oil discharge part 408 may be formed by cutting-out an outer diameter surface of the stator oil disc body 392.

Rotation prevention protrusions 404 protruding in an axial direction may be provided at the stator oil disc body 392.

As shown in FIG. 13, for instance, the rotation prevention protrusions 404 may be configured to protrude to both sides of the stator oil disc body 392.

Concave parts 172 concaved in a radius direction and extended in an axial direction may be formed on an external surface of the stator core 171.

The stator core 171 may be divided into two in an axial direction, i.e., a first stator core part 171a and a second stator core part 171b. And the stator oil disc 390 may be insertion-coupled between the first stator core part 171a and the second stator core part 171b.

In some examples, the oil grooves 402 formed at both sides of the stator oil disc 390 are covered by the first stator core part 171a and the second stator core part 171b, and the oil 272 which moves along each of the oil grooves 402 directly contacts the first stator core part 171a and the second stator core part 171b. This may allow the first stator core part 171a and the second stator core part 171b to be cooled rapidly.

The rotation prevention protrusions 404 may be configured to be inserted into the concave parts 172, respectively.

In some examples, the stator oil disc 390 may be prevented from being rotated with respect to the stator core 171.

Figure 18:
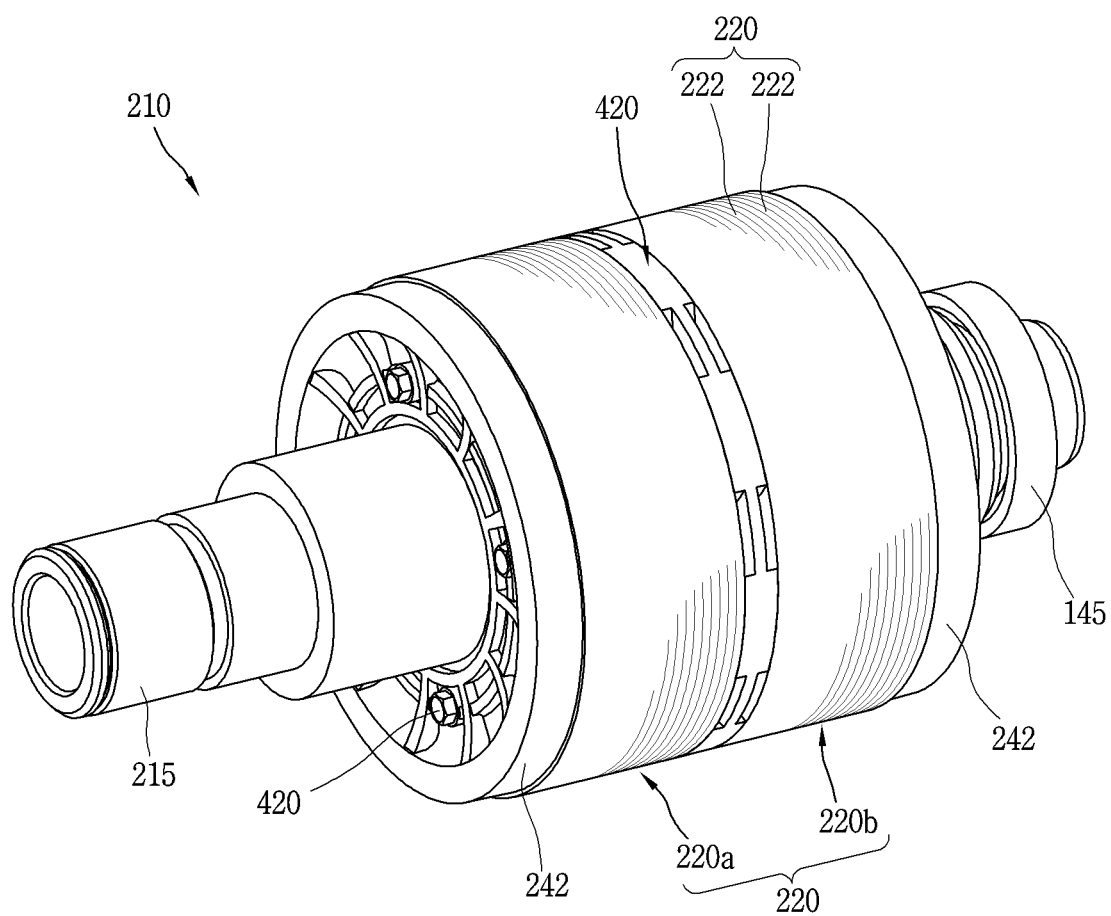
FIG. 18 is a perspective view showing an example of a rotor of FIG. 1.
Figure 19:
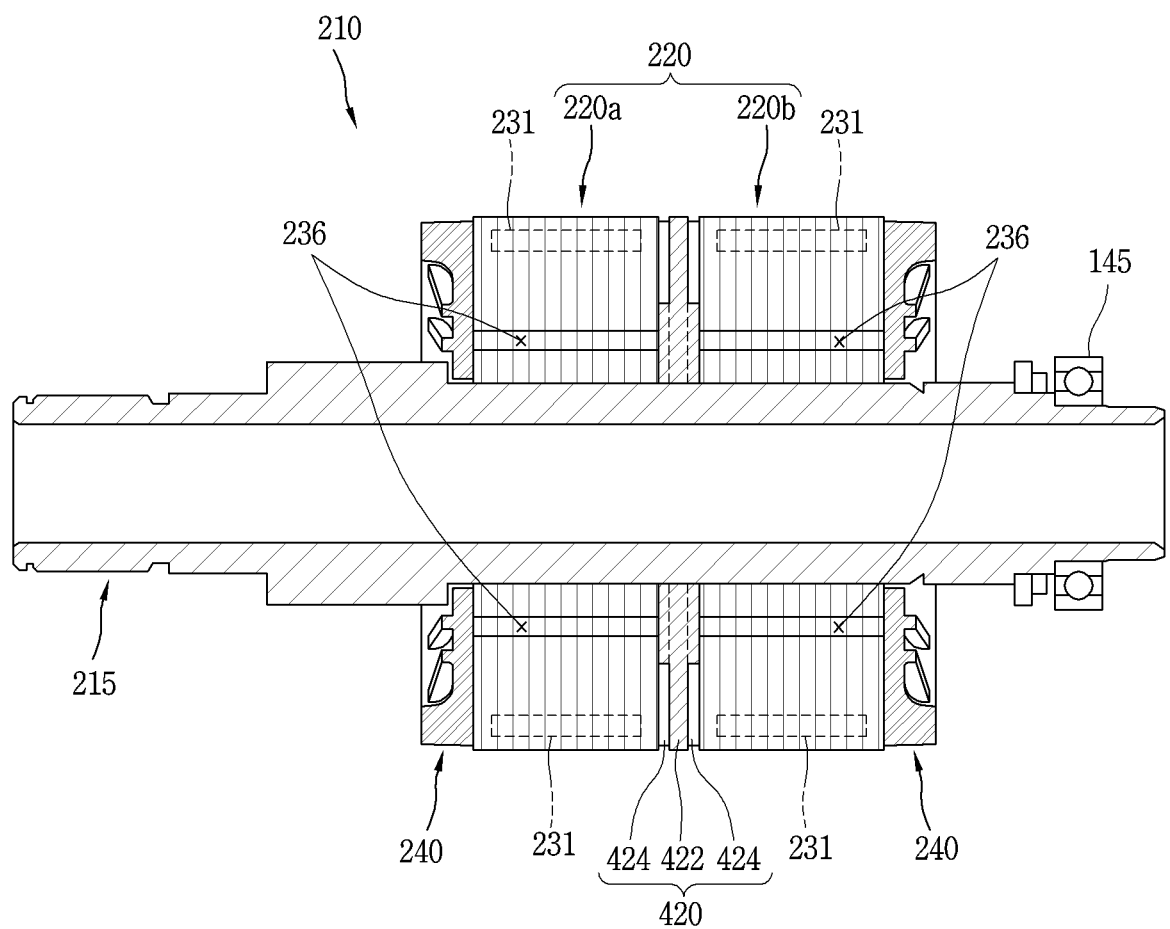
FIG. 19 is a sectional view showing the rotor of FIG. 18.
Figure 20:
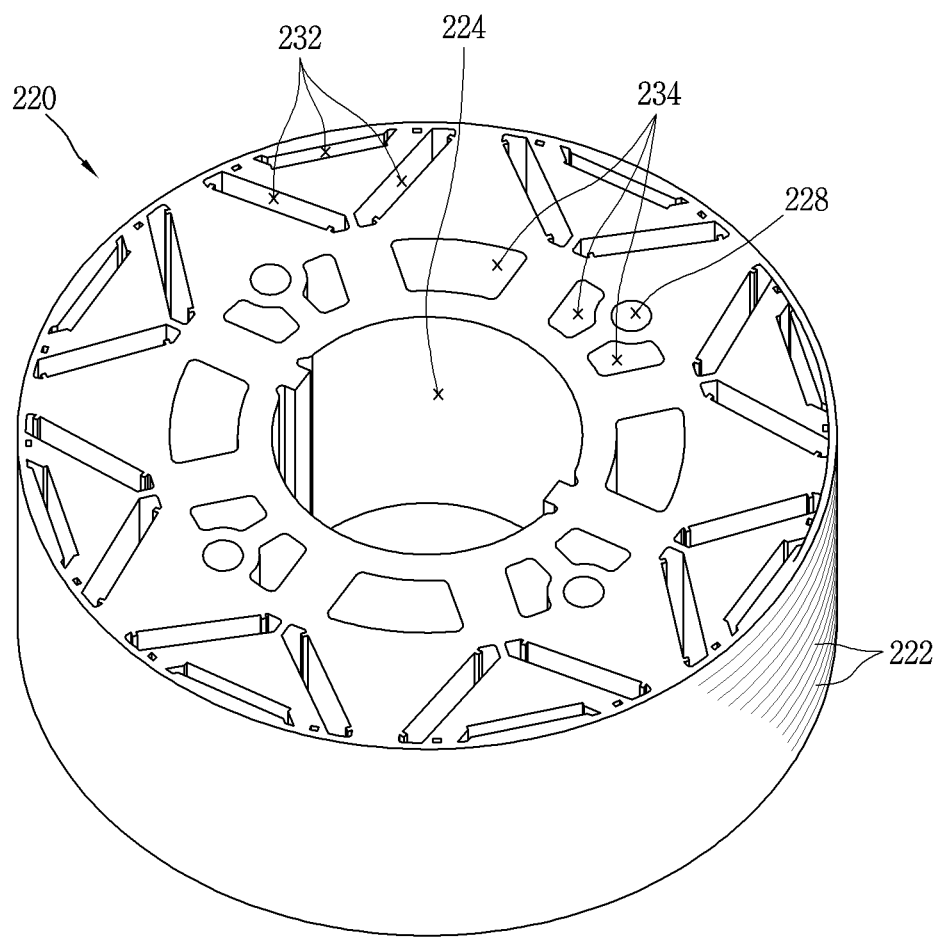
FIG. 20 is a perspective view showing an example of a rotor core of FIG. 18.
Figure 21:
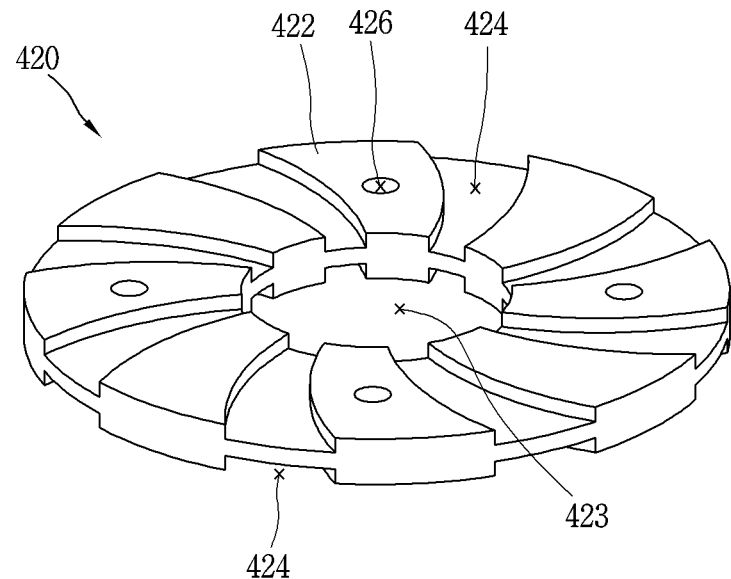
FIG. 21 is a perspective view showing an example of a rotor oil disc of FIG. 18.

FIG. 18 is a perspective view of a rotor of FIG. 1. FIG. 19 is a sectional view of a rotor of FIG. 18. FIG. 20 is a perspective view of a rotor core of FIG. 18. And FIG. 21 is a perspective view of a rotor oil disc of FIG. 18.

As shown in FIGS. 18 and 19, for instance, the rotor 210 may be configured to be provided with a rotor core 220 having a plurality of core parts coupled to each other in an axial direction; and a rotor oil disc 420 inserted between the plurality of core parts, and configured to move the oil 272 into the rotor core 220 when the rotor core 220 rotates.

The rotor core 220 may be provided with a first rotor core part 220a and a second rotor core part 220b spaced apart from each other in an axial direction.

In this embodiment, the plurality of core parts are configured in two, and the rotor oil disc 420 is configured in one. However, this is merely exemplary, and the number of the plurality of core parts and the rotor oil disc 420 may be controlled property.

End plates 240 may be provided at both ends of the rotor core 220.

In some examples, magnets 231 provided in the first rotor core part 220a and the second rotor core part 220b may be supported in an axial direction.

The end plates 240, the rotor core 220 and the rotor oil disc 420 may be integrally coupled to one another by a plurality of coupling members 242 inserted in an axial direction.

For instance, as shown in FIG. 19, a rotation shaft hole 224 for inserting the rotation shaft 215 may be penetratingly-formed at the rotor core 220.

The rotor core 220 may be provided with a plurality of magnet accommodation parts 232 penetratingly-formed in an axial direction in order to insert the plurality of magnets 231.

The rotor core 220 may be provided with a plurality of through-parts 234 penetratingly-formed at a circumference of the rotation shaft hole 224.

The rotor core 220 may be provided with a plurality of coupling member insertion holes 228 penetratingly-formed in an axial direction in order to insert the plurality of coupling members 242.

The rotor oil disc 420 may be provided with a rotor oil disc body 422 of a disc shape.

As shown in FIG. 20, for instance, a rotation shaft accommodation part 423 for inserting the rotation shaft 215 may be penetratingly-formed at a middle region of the rotor oil disc body 422.

A plurality of coupling member insertion holes 426 penetratingly-formed in order to insert the plurality of coupling members 242 may be formed at the rotor oil disc body 422.

The rotor oil disc 420 may be provided with oil transfer grooves 424 concaved from a plate surface of the rotor oil disc body 422 in a thickness direction, and extended in a radius direction.

The oil transfer grooves 424 may be formed at both plate surfaces of the rotor oil disc body 422.

More specifically, the oil transfer grooves 424 may be configured to have the same shape on the same position at both plate surfaces of the rotor oil disc body 422.

Each of the oil transfer grooves 424 may be formed so that an inner width is increased towards the outside in a radius direction.

The oil transfer grooves 424 formed at both plate surfaces of the rotor oil disc body 422 may be configured that an end part close to an outer diameter surface of the rotor oil disc body 422 is arranged at the front side, and an end part close to the rotation shaft accommodation part 423 is arranged at the rear side, along a rotation direction of the rotor 210.

In some examples, when the rotor 210 is rotated, the oil 272 of the case 110 may move to a center of the rotor core 220 along the oil transfer grooves 424.

The oil transfer grooves 424 may be formed to be communicated with the through-parts 234 of the rotor core 220.

Among the through-parts 234 of the rotor core 220, the through-part communicated with the oil transfer grooves 424 may form an oil channel 236 for moving the oil 272 which has been transferred along the oil transfer grooves 424, in an axial direction.

Figure 22:
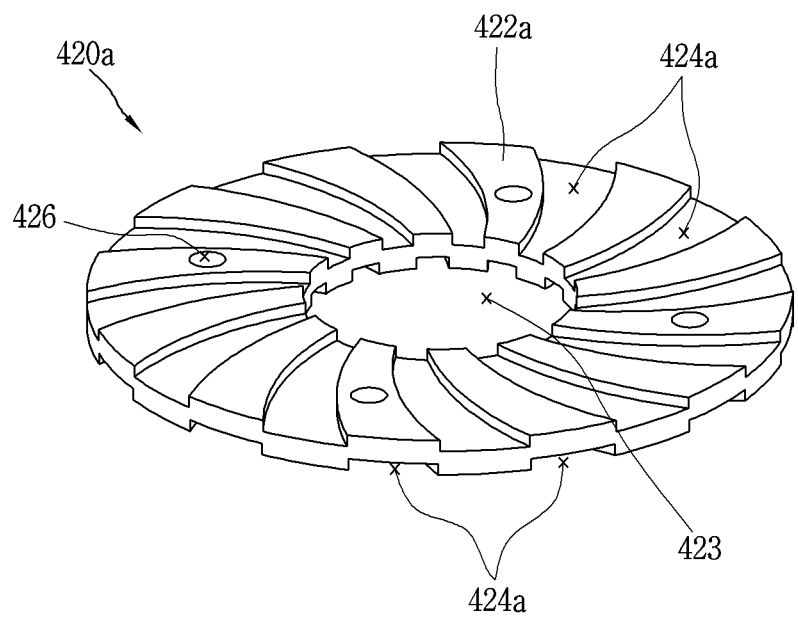
FIG. 22 is a view showing another example of a rotor oil disc of FIG. 20.
Figure 23:
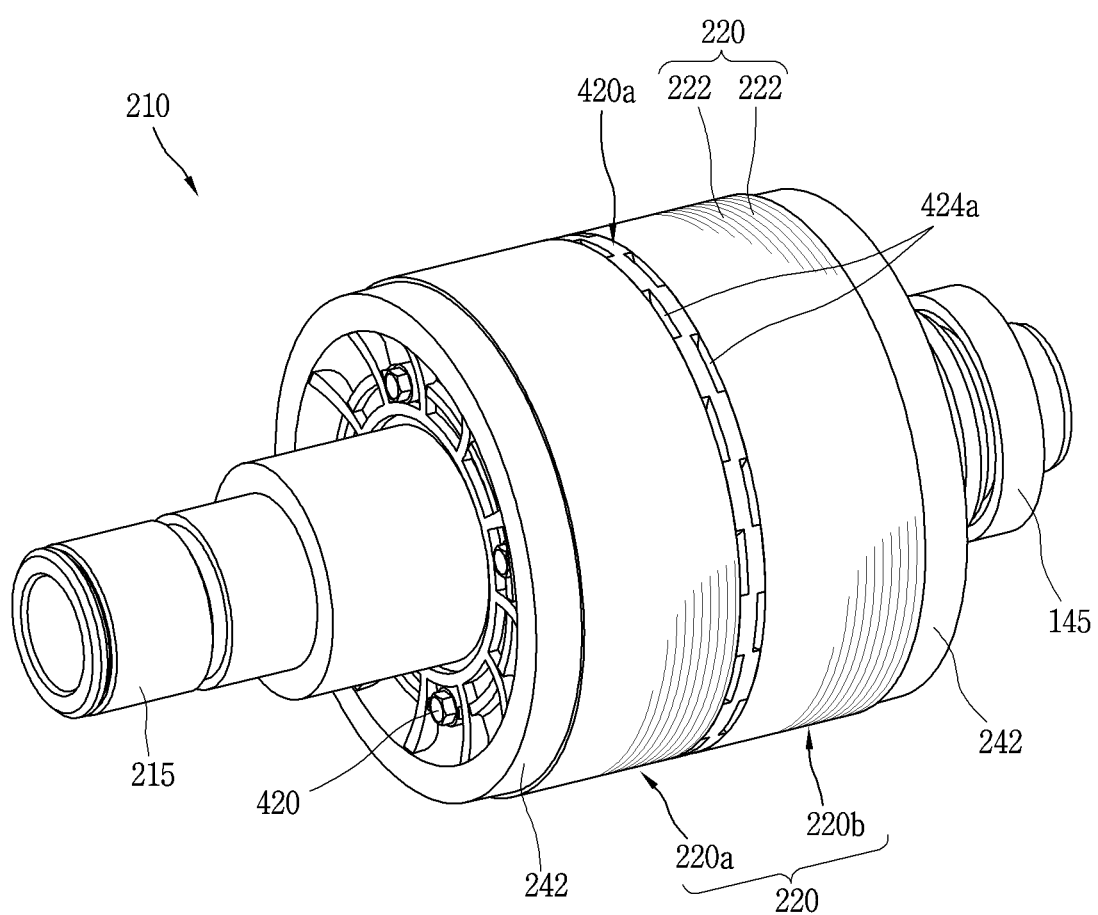
FIG. 23 is a perspective view showing an example of a rotor and a rotor oil disc of FIG. 22.
Figure 24:
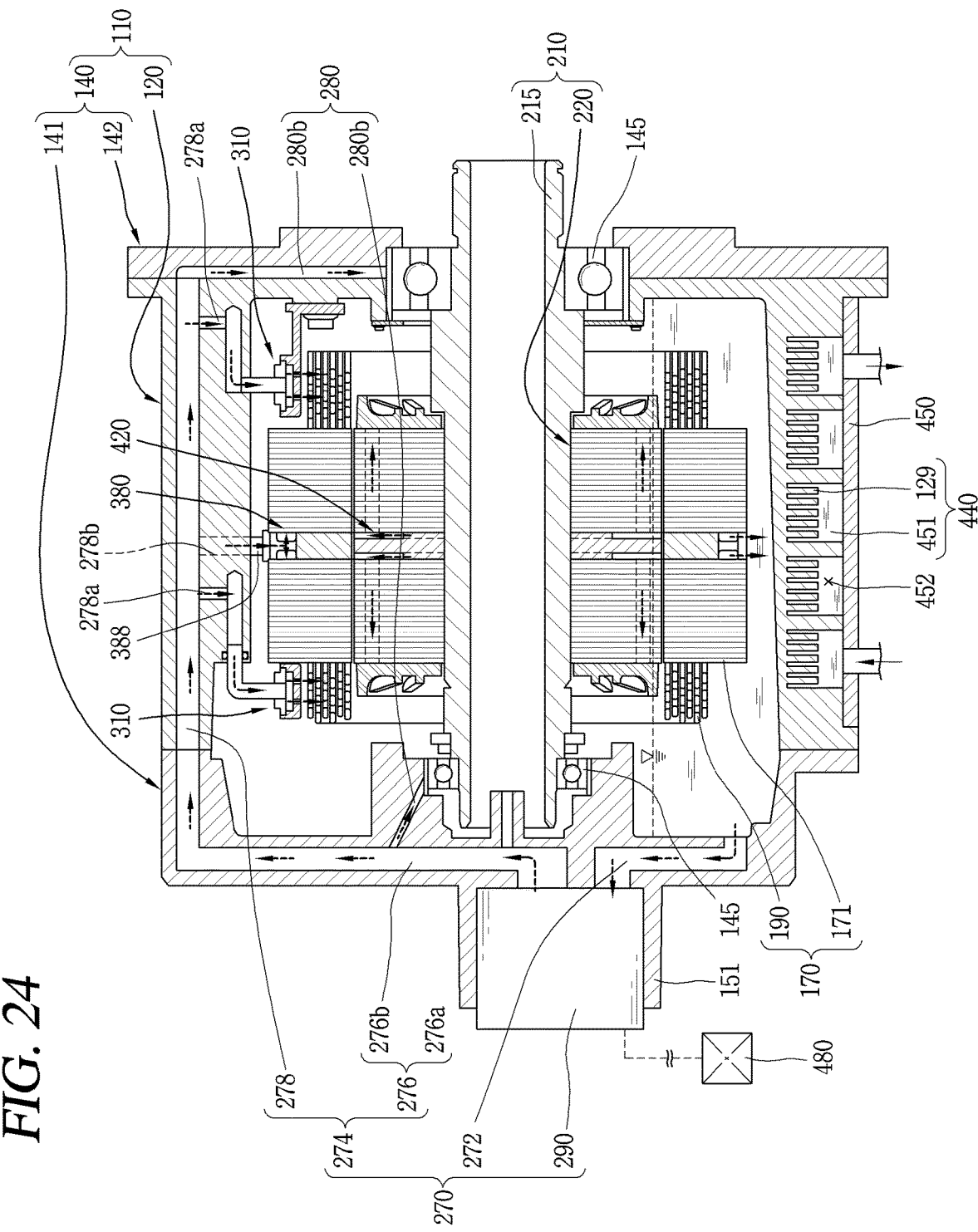
FIG. 24 is a view for explaining an example of spraying of oil in the electric motor of FIG. 1.

FIG. 22 is a view showing an example of a modified implementation of a rotor oil disc of FIG. 20. FIG. 23 is a perspective view showing an example of a rotor to which a rotor oil disc of FIG. 22 has been applied.

As shown in FIG. 22, a rotor oil disc 420a may be provided with a rotor oil disc body 422a having a disc shape, and having a rotation shaft accommodation part 423 for inserting the rotation shaft 215 at a middle region thereof.

The rotor oil disc 420a may be provided with a plurality of oil transfer grooves 424a concaved from one surface of the rotor oil disc body 422a and protruding to another surface.

The oil transfer grooves 424a defined at both plate surfaces of the rotor oil disc body 422a may be configured that an end part close to an outer diameter surface of the rotor oil disc body 422a is arranged at the front side, and an end part close to the rotation shaft accommodation part 423 is arranged at the rear side, when the rotor 210 is rotated.

In some examples, when the rotor 210 is rotated, the oil 272 inside the case 110 may move to the inside of the rotor 210 in a radius direction of the rotor 210, along the oil transfer grooves 424a.

As shown in FIG. 23, the rotor oil disc 420a may be insertion-coupled between the first rotor core part 220a and the second rotor core part 220b.

The oil 272 which has been transferred along the oil transfer grooves 424a may move in an axial direction, along the oil channel 236 of the first rotor core part 220a and the second rotor core part 220b.

Under the structure, the rotor core 220 (the first rotor core part 220a and the second rotor core part 220b) may be cooled rapidly.

In some examples, when a driving starts, a power source may apply power to the stator coil 190, and the rotor 210 may be rotated centering around the rotation shaft 215 by an interaction between the stator coil 190 and the magnets 231. For example, the rotor 210 may be coupled to the rotation shaft 215 and configured to be rotated by the rotation shaft 215. That is, the rotation shaft 215 may serve as a rotation center of the rotor 210.

If the power source is applied to the stator coil 190, an inner temperature of the case 110 may be increased by a heating operation of the conductors 195.

The controller 480 may control the oil 272 to be sprayed through the oil spraying part 270, by controlling the oil pump 290.

Further, the controller 480 may control the cooling water 451 to circulate via the cooling water heat exchange part 440, by controlling the cooling water pump 464.

If the oil pump 290 is rotated, the oil 272 which is at a lower part inside the case 110 may be sucked to be moved to an upper region of the case 110 along the oil passage 274.

The oil 272 which has been moved to the second section 278 of the case body 120 may be diverged to the first divergence section 278a and the second divergence section 278b, and may be introduced into the coil end spraying parts 310 and the stator core spraying part 380, thereby being sprayed to each of the coil ends 190a and the stator core 171.

The oil 272 which has been introduced into the first divergence section 278a may be introduced into the oil accommodation space 322 inside the spraying guide body 320 and the spraying guide cover 350, through the connection pipe 360.

The oil 272 which has been introduced into the spraying guide body 320 and the spraying guide cover 350 may be sprayed to an upper surface of each of the coil ends 190a, through the spraying holes 327.

The oil 272 which has been sprayed to the upper surface of each of the coil ends 190a may downward move along the upper surface of each of the coil ends 190a, thereby rapidly cooling each of the coil ends 190a.

The oil 272 which has been sprayed through the second divergence section 278b may be introduced into the oil grooves 402, through the oil introduction part 406 of the stator oil disc 390.

The oil 272 which has been introduced into the oil grooves 402 may contact the first stator core part 171a and the second stator core part 171b, and may move in a circumferential direction of the first stator core part 171a and the second stator core part 171b, thereby rapidly cooling the first stator core part 171a and the second stator core part 171b.

The oil 272 which has cooled the first stator core part 171a and the second stator core part 171b while moving along the oil grooves 402 may be discharged to the oil storage space 122 of the case 110, through the oil discharge part 408.

A part of the oil 272 on the oil passage 274 may move along the bearing oil supplying parts 280a, 280b, thereby being sprayed to each of the bearings 145.

In some examples, a friction of each of the bearings 145 may be reduced, and each of the bearings 145 may be cooled rapidly.

If the rotor 210 is rotated, the oil 272 which is at a lower part of the case 110 may move into the rotor core 220 along the oil transfer grooves 424 of the rotor oil disc 420.

More specifically, the oil transfer grooves 424 inserted into a part below an oil surface of the oil 272 which is at a lower part of the case 110 may pressurize the oil 272 at the time of a rotation, thereby making the oil 272 move to the inside of the oil transfer grooves 424.

The oil 272 which has been moved to the inside of the oil transfer grooves 424 in a radius direction of the rotor core 220 may be moved to both ends of the rotor core 220 in an axial direction, along the oil channel 236 communicated with the oil transfer grooves 424, thereby being discharged out.

In some examples, the rotor core 220 (the first rotor core part 220a and the second rotor core part 220b) may be cooled rapidly.

If the cooling water pump 464 is driven, the cooling water 451 may be introduced into the cooling water accommodation space 452 inside the cooling water heat exchange part 440, through the cooling water introduction part 454.

The oil 272 which has cooled the coil ends 190a, the stator core 171 and the rotor core 220 may return to the oil storage space 122 of the case 110, with an increased temperature.

The oil 272 of the oil storage space 122 may be cooled by contacting the cooling water heat exchange part 440.

The cooling water 451 of the cooling water heat exchange part 440 may have a temperature increase by being heat-exchanged with the oil 272, and the cooling water 451 having its temperature increased may be discharged out through the cooling water discharge part 456.

The cooling water 451 which has been discharged out through the cooling water discharge part 456 may move along the cooling water circulation circuit 460, and may be cooled by being heat-exchanged at the cooling water heat exchanger 466. Then, the cooling water 451 may be introduced into the water jacket 450 through the cooling water introduction part 454, thereby cooling the oil 272. These processes may be performed repeatedly.

In the foregoing, exemplary embodiments of the present disclosure have been shown and described. However, the present disclosure may be embodied in various forms without departing from the spirit or essential characteristics thereof, and accordingly, it is intended that the embodiment described above not be limited by the detailed description provided herein.

Moreover, even if any embodiment is not specifically disclosed in the foregoing detailed description, it should be broadly construed within the scope of the technical spirit, as defined in the accompanying claims. Furthermore, all modifications and variations included within the technical scope of the claims and their equivalents should be covered by the accompanying claims.

The invention claimed is:

1. An electric motor comprising:
   a case;
   a stator including a stator core disposed inside the case and a stator coil disposed at the stator core, the stator core having a first stator core and a second stator core that are spaced apart from each other in an axial direction of the stator;

a rotor including a rotating shaft and being configured to rotate with respect to the stator; and an oil spraying part configured to store oil in a lower part of the case and to spray the oil to a heating part inside the case, the oil spraying part including an oil passage configured to guide the oil to an upper area of the case and an oil pump configured to pump the oil in the lower part of the case, wherein the oil spraying part includes a stator core spraying part configured to spray the oil to the stator core, the stator core spraying part including a stator oil disc that has a ring shape and is coupled to and inserted between the first stator core and the second stator core, and wherein the stator oil disc defines:

a first oil groove that is recessed in the axial direction from a first surface of the stator oil disc facing the first stator core, that is covered by the first stator core, and that extends along a circumferential direction of the stator, and a second oil groove that is recessed in the axial direction from a second surface of the stator oil disc facing the second stator core, that is covered by the second stator core, and that extends along the circumferential direction of the stator.

2. The electric motor of claim 1, wherein the oil spraying part further includes a coil end spraying part that is configured to spray the oil to coil ends of the stator coil, that defines spraying holes configured to discharge the oil, and that is disposed outside the coil ends.

3. The electric motor of claim 2, wherein the coil end spraying part includes:

a spraying guide body that defines the spraying holes at a bottom surface thereof and an accommodation space configured to receive the oil therein; and a spraying guide cover that is coupled to the spraying guide body and that covers the accommodation space.

4. The electric motor of claim 3, wherein the spraying holes are arranged along a plurality of rows, and the spray guide body includes separation guides disposed in the accommodation space and configured to guide the oil to flow along the plurality of rows.

5. The electric motor of claim 1, wherein the stator oil disc includes teeth portions that correspond to poles and slots of the stator core, and wherein the first and second oil grooves extend along circumferences of the teeth portions in the circumferential direction of the stator.

6. The electric motor of claim 5, wherein the stator oil disc defines an oil introduction part recessed in a radius direction of the stator and configured to communicate with the first and second oil grooves.

7. The electric motor of claim 5, wherein the stator oil disc defines an oil discharge part recessed in a radius direction of the stator and configured to communicate with the first and second oil grooves.

8. The electric motor of claim 5, wherein the stator core defines concave parts recessed in a radius direction from an external surface of the stator core, and wherein the stator oil disc includes rotation prevention protrusions inserted into the concave parts.

9. The electric motor of claim 1, wherein the rotor includes:

rotor cores that are arranged along the rotation shaft, that surround the rotation shaft, and that are configured to rotate the rotation shaft relative to the stator; and a rotor oil disc inserted between the rotor cores and configured to accelerate a flow of the oil based on rotation of the rotor cores relative to the stator.

10. The electric motor of claim 9, wherein the rotor oil disc defines a shaft hole at a central region of the rotor oil disc and at least one oil transfer groove that extends outward from a circumference of the shaft hole in a radius direction and that is recessed in the axial direction.

11. The electric motor of claim 10, wherein the rotor cores define an oil channel that extends along the axial direction of the rotor and that is configured to communicate with the at least one oil transfer groove.

12. The electric motor of claim 10, wherein the at least one oil transfer groove includes oil transfer grooves that are recessed from a first side of the rotor oil disc in the axial direction, and wherein the rotor oil disc includes protrusions that protrude from a second side of the rotor oil disc in the axial direction and that are located at positions corresponding to the oil transfer grooves.

13. The electric motor of claim 10, wherein the at least one oil transfer groove is recessed from both sides of the rotor oil disc in the axial direction.

14. The electric motor of claim 1, wherein the case includes:

a case body having a cylindrical shape; and a case cover disposed at both ends of the case body, wherein the electric motor further includes bearings configured to rotatably support the rotation shaft and located at the case cover, and wherein the oil spraying part further includes a bearing oil supplying part configured to supply the oil to the bearings.

15. The electric motor of claim 1, wherein the case includes a cooling water heat exchange part configured to exchange heat between the oil and cooling water.

16. The electric motor of claim 15, wherein the cooling water heat exchange part includes heat exchange fins that protrude to an inside of the cooling water heat exchange part and that increase a contact area with the cooling water.

17. The electric motor of claim 2, wherein the stator coil protrudes from both axial ends of the stator core in the axial direction, and wherein the coil ends are exposed to an outside of the stator core.

18. The electric motor of claim 4, wherein the separation guides are spaced apart from each other and each of the separation guides is disposed between the plurality of rows of the spraying holes.

19. The electric motor of claim 1, wherein the first and second oil grooves face each other and are recessed toward each other in the axial direction, and wherein a depth of each of the first and second oil grooves in the axial direction is less than half of a thickness of the stator oil disc in the axial direction.

* * * * *